3,055,734
PROCESS FOR SEPARATING SEA SALTS
Edmund S. Pomykala, 57 Mohawk St., Mobile, Ala.
Filed Oct. 5, 1956, Ser. No. 614,197
3 Claims. (Cl. 23—89)

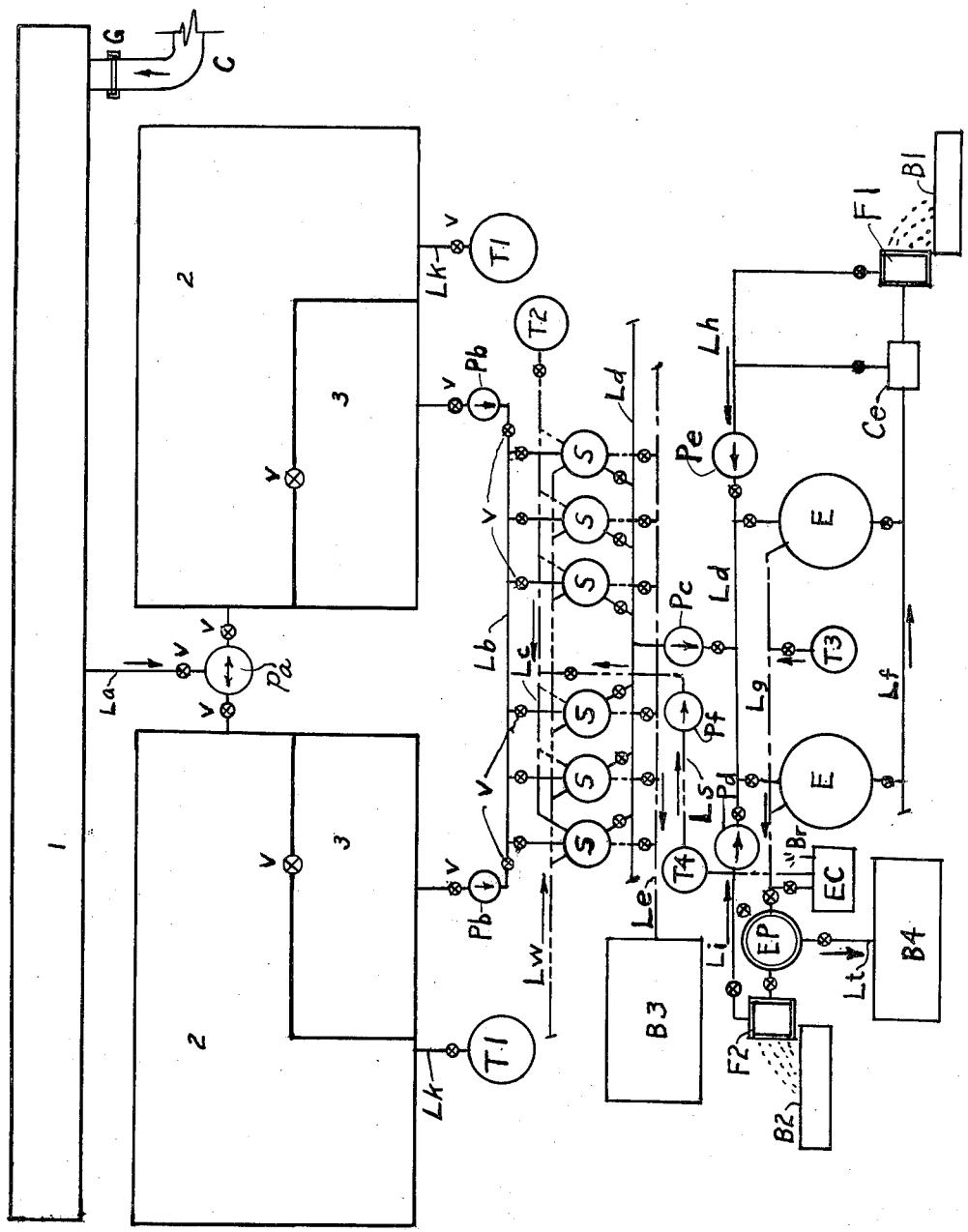

This invention relates to separation and purification of salts obtained from sea water and similar brines. The present application is a continuation-in-part of my copending application, Serial No. 399,963, filed December 23, 1953, now abandoned, and relates to a new and improved method of separation and purification of sea salts. As mentioned in my former application and as pointed out by other, particularly Percie H. Coward, in U.S. Patent 681,407, the present prevailing practice is to concentrate the sea water in various ponds, using natural winds and solar heat for evaporation. Different salts separate as saturation is reached. There is no difficulty with calcium salts, as they separate out fairly easily. However, as sodium, magnesium and potassium salts separate from the brine particularly in the later stages, there is difficulty, as the crystallization of the various salts tends to overlap, complex crystals are formed and the salts are intermixed, and in many cases contaminated by dirt. In particular, it may be mentioned that sodium salt, NaCL is contaminated with magnesium salts in the later stages of crystallization so that a large portion of the sodium salt loses its value.

One of the main objects of this invention is to produce clean separation of the main salt components from sea brines.

Another object is to produce a pure and clean sodium salt from the sea brine with a high yield and which will be equal to or better than the present article of commerce.

Another object is to provide a method for production of bromine.

A further object is to provide a method for cheap production of magnesium.

Still another object is to provide a method which is capable of separating gold and other heavy metals from sea water as a by-product.

A further object is to accomplish most of the above work by atmospheric evaporation using winds and solar heat.

A final object is to provide a method which will lend itself to mechanized production, and with this object in view, to provide an apparatus, some old and some new, which will accomplish the above work.

In the present state of the art as pointed out above, the precipitation of the salts is carried out in stages; calcium salts are first precipitated, then sodium salt begins to separate out when the brine reaches a specific gravity of about 1.20. Sodium with some magnesium salts separates out in later stages, and finally sodium, magnesium and potassium separate out as complex salts. If, however, the magnesium salts can be precipitated with proper chemicals at the incipient point of brine saturation with magnesium salt, and the remaining brine settled to clarity, and then decanted and evaporated, the sodium salt obtained will be very pure, not contaminated with magnesium salt to any appreciable extent, and a high yield will be obtained of a uniform product. There will be other desirable benefits, traces of gold oxides and other heavy metals, whose salts are dissolved in sea water will also be carried down with the magnesium compound and the line of separation between sodium and potassium salts will be sharp if in addition proper thermal control is maintained. Small further treatments have to be made in some of the products as indicated hereinafter, and it was found that some special equipment had to be devised to achieve this desirable objective. All this is described in the following pages.

First, an experiment was performed on sea water taken from the Gulf of Mexico at Pensacola Beach, Florida. This water is crystal clear. As analyzed by others it was assumed that this water had 3.5 parts of various salts to 100 parts of water by weight, and that the detailed analysis according to the Encyclopedia Britannica was as follows:

| Salt | per 1,000 parts of water | percent of total salts |
|---|---|---|
| NaCl | 27.213 | 77.758 |
| MgCl$_2$ | 3.807 | 10.878 |
| MgSO$_4$ | 1.658 | 4.737 |
| CaSO$_4$ | 1.260 | 3.600 |
| K$_2$SO$_4$ | 0.863 | 2.465 |
| CaCO$_3$ | 0.123 | 0.345 |
| MgBr$_2$ | 0.076 | 0.217 |
| | 35.000 | 100.000 |

The average specific gravity of the water used, in the experiment as measured by a hydrometer was 1.024. The temperature of the water was 27° C. The water tested gave a slightly alkaline reaction.

The water was first evaporated in stages to a point of incipient saturation with sodium salt. This point was reached when the brine reached a concentration of approximately 12% of the original volume and the hydrometer reading at this stage was 1.185. Up to this point calcium salts being only faintly soluble were mostly precipitated. The brine at this point is treated with calcium chloride to partially eliminate the sulphate ion. Sufficient calcium chloride was used to eliminate approximately 80% of the sulphate ions in the brine.

$$CaCl_2 + MgSO_4 \rightarrow MgCl_2 + CaSO_4\downarrow$$

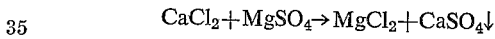

After several days the brine was further treated with a very small amount of sodium carbonate (Na$_2$CO$_3$) to eliminate the residual calcium ion remaining from the first treatment, the brine was then transferred to another vessel and further evaporated, precipitating salt (NaCl) to a point of incipient saturation with magnesium salts. The brine at this point (specific gravity 1.25) containing sodium, magnesium and potassium salts with traces of salts of rare metals, was decanted and transferred to another vessel and treated with solid soda ash (Na$_2$CO$_3$). Sufficient soda ash was used to substantially precipitate all of the MgCl$_2$, MgSO$_4$, MgBr$_2$ as magnesium carbonate MgCO$_3$. The amount of soda ash was computed on the basis of molecular reactive proportions with about 5% excess. With this magnesium carbonate there are precipitated also the compounds of rare heavy metals such as gold which are found in sea water. On standing, the magnesium carbonate settles to the bottom leaving a clear brine solution on top. With salt brine concentrated as indicated above, the proportions are roughly 75% clear brine and 25% magnesium carbonate saturated with brine. The clear brine is decanted, siphoned or skimmed off the precipitate into an evaporating vessel, while the remaining magnesium carbonate and brine is washed with pure fresh water, using 1¼ parts of water to one part of magnesium carbonate brine mixture. On standing, the magnesium carbonate again settles leaving a clear but a weaker brine on top. This clear brine is again cycled into the evaporating vessel containing the first portion of the concentrated clear brine. This procedure may be varied on a commercial scale by using mechanical filters to separate the brine from magnesium carbonate precipitate and the trace of various minor constituents which are mixed with it. Using the procedure as outlined here the magnesium carbonate precipitate may be washed further as desired and finally removed; concentrated further by evaporation and partial calcining and finally sent to an electro-chemical plant for final processing and reduction to metallic magnesium, by the electrolytic process involving suspension of partially calcined compounds of magnesium and other compounds of rare heavy metals, in a molten cell bath composed of the fluorides of magnesium, sodium and barium. In this electro-chemical process, the metal magnesium is separated on top, while the heavy metals on reduction settle to the bottom and remain in the sludge, and may on suitable concentration be finally removed and refined.

The clear brine in the evaporating vessel virtually free from calcium and magnesium in various combined forms is now evaporated. This may also be done naturally by solar heat and wind, but preferably to secure a high grade product, and later to obtain a sharp division of separation between sodium and potassium salts, it is desirable to do this work with artificial heat working with hot solutions in mechanical plants similar to existing layouts used for salt making, or concentrating plants used in caustic soda manufacture, of course with some critical changes.

To secure a sharp division and separation of sodium and potassium salts in the advanced stages, precipitation from hot solutions is most desirable. Potassium salts slightly mixed with sodium are precipitated by crystallization under rapid cooling from hot solutions, preferably as shown hereinafter by spray evaporation and cooling in a partial vacuum immediately followed by rapid convective cooling in a coil.

In the preferred method of separating sea salts according to the process outlined, to perform this operation economically and to obtain a high quality product, it is intended to do the bulk of evaporation up to the point of incipient saturation of the brine with magnesium salts, in large shallow basins with solar heat and wind. From there on it is more desirable to do the work mechanically and perform the further evaporation by artificial heat. Accordingly the following plant is used which is outlined in schematic form on the accompanying drawings.

The single FIGURE represents a general schematic layout of the separation system.

In the drawing, C is a canal leading from the sea or a suitable arm of the sea into a primary operating basin 1.[1]

Gate G controls the flow of water into basin 1. The sea water is evaporated to gravity of about 1.12 in basin 1, and is then transferred to concentrating basins 2, through lines L$a$, pumps P$a$, and suitable valves $v$, as shown. More concentrating basins 2 may be used if desired, depending on the overall capacity of the plant. In all these basins particularly basins 2, calcium salts are largely precipitated out. The brine in basins 2 may also undergo a primary treatment with calcium chloride solution in order to partially eliminate the sulphate ion:

$$CaCl_2 + MgSO_4 \rightarrow MgCl_2 + CaSO_4 \downarrow$$

$$CaCl_2 + K_2SO_4 \rightarrow 2KCL + CaSO_4 \downarrow$$

For best operating conditions it would be desirable to eliminate about 80% of the total sulphate ions contained in sea water or in the range of 60–90%. Normally there will result a small residual concentration of calcium ions from this treatment. These may be eliminated by treating the brine in a preliminary form with a trace of soda ash ($Na_2CO_3$).

The calcium chloride solution is stored in tanks T1 and is injected into basins 2 through lines L$k$ controlled by valves $v$. The brine in basins 2 is concentrated to specific gravity of 1.19 and is then transferred to basins 3 for further concentration to specific gravity of 1.25, and primary crystallization and precipitation of sodium chloride (NaCl), the brine then in turn is cycled to settling or treating tanks S through lines L$b$, pumps P$b$ as shown or further required.

The brine is treated in tanks S with soda ash, either solid or in solution; sufficient soda ash ($Na_2CO_3$) is used to precipitate substantially all the magnesium with a slight excess. (Other agents such as the alkalis NaOH or KOH could be used but they are much more expensive and much slower in operation.) The solution of soda ash can be stored in tank T2, and is transmitted through line L$c$ and suitable valves (not shown) as required. The reaction of soda ash with the concentrated brine is rapid and practically all the various magnesium salts precipitate out as magnesium carbonate.

The precipitate is very finely divided and light, and takes a day or so to settle. On settling the clear treated brine is removed through line L$d$, pump P$c$ and suitable valves as required. This brine is transferred into evaporating tanks E. For simplicity and continuity the brine phase will be followed through. The brine is continuously evaporated with artificial heat, preferably with steam coils under various systems, already well developed. The temperature can vary over a wide range. The preferred range is 180–212° F., or 82°–100° C. As the evaporation takes place the sodium salt as NaCl precipitates out and settles in the inverted cone like bottom of evaporators E, from here it is removed periodically as a fine slurry, through line L$f$, is sent through centrifuge C$e$, where it is concentrated to a heavy slurry. The liquid is routed back to the evaporators E, while the heavy slurry goes to a rotary suction filter F1 such as the "Oliver" suction filter.[2] Here the salt is deposited on a rotating drum, washed with pure water, detached and dropped into storage bin, B1. The liquid extracted in filter F1, rich in potassium salts, is routed back to the evaporators E through line L$h$, pump P$e$ and suitable valves as shown. As the liquid in the evaporators becomes concentrated with potassium salts, it is bled off into line L$g$, thence to evaporator-precipitator EP. This is similar in construction to that shown in my former application Ser. No. 114,476. Here the hot concentrated liquid is sprayed into a partial vacuum induced by cold condensing sea water circulating in a condenser (not shown), and immediately further cooled by convection in a coil. The temperature of the brine drops from approximately 100° C. to 25° C. In this temperature drop, the slight amount of sodium sulphate present becomes actually more soluble so it stays in solution. The solubility of sodium chloride is almost constant in this range, so this salt also stays in solution. The carbonates of sodium and potassium are highly soluble so they also stay in solution. So practically the only salts that selectively separate out are those of potassium, both as the sulphate and the chloride, the actual proportion of each depending on the elimination of sulphate ion in basin 2 beforementioned. Actually potassium sulphate is highly desirable for some special fertilizers, however superabundance of sulphate ions causes some difficulty in later stages of sodium chloride separation and so its presence has to be controlled.

In addition to the above there will be a slight negligible admixture of sodium salts of no vital importance, including complex salts like $K_3Na(SO_4)_2$; $K_4Na_2(SO_4)_3$. So again we have a slight slurry in the bottom of the evaporator-precipitator EP similar to the one described for sodium salt, and again the further operation is similar. The mixture may be further cooled in a coil after-cooler for further precipitation of potassium salts, as already described. An intermediate centrifuge C$e$ may also be used for concentrating the slurry if so desired. It has been omitted here for simplicity and as adding nothing vital to the method. In identical similarity to separating the sodium chloride the potassium salts are deposited on the rotating drum of the rotary suction filter F2, washed with pure water if desired and dropped into storage bin, B2. The liquid remaining is routed via line L$i$ and pump P$d$

---

[1] In many places along the sea shores particularly along the Florida keys such basins exist in natural state and can be modified for production at very little cost.

[2] Described in Riegel's Ind. Chemistry, p. 709.

back to main evaporators for mixing with a fresh charge from treating tanks S. Under very cold atmospheric conditions this last centrifuge and filter F2 may be dispensed with. The slurry from evaporator-precipitator may be routed through line Lt into outdoor basin B4 and there precipitated further. However it is felt this is not as economical or satisfactory as the first method shown.

After several charges have passed through the main evaporators E, the liquid in the evaporators becomes concentrated with carbonate and bromide ions. Such a liquid is very valuable and has to be conserved, and yet the system has to be balanced for operation. The preferred way to get the system in balance and to conserve the valuable products is to by-pass part of the contents of the evaporators through line Lg into electrolytic cell EC. By electrolyzing the hot brine rich in chloride and bromide ions, bromine is released first and discharged as a gas and it passes off with some steam. The bromine and steam may be led to a suitable reservoir (not shown) and be condensed and separated by methods well known to the art. The liquid in the cell after electrolyzing contains hydroxyl ions and is led to a storage tank T4, whence it is pumped through line Ls, by a pump Pf, to junction with line Lc, thence to treating tanks S, for treating new charges of raw brine.

Now returning to the precipitated mixture of magnesium carbonate and compounds of heavy metals in settling tanks S, this precipitated mixture is treated with clear fresh water from line Lw. Approximately 1¼ parts of fresh water is used to one part of heavy brine-precipitated mixture. After settling, the clear weakened brine is routed on to the main evaporators E. The precipitate may be treated further by a similar rewashing operation as desired, except the clear brine on top would be wasted as being of only a slight value. After such suitable washing the precipitated mixture with the contained water is drained through line Le and necessary valves v, to concentrating basins B3. In concentrating basin B3, this precipitate can be further washed by such existing devices as the continuous countercurrent decantation process (C.C.D.) and thickened by centrifugal separators (not shown) evaporated for easy handling, and sent on to magnesium reducing plants for final calcining and refining to metal. In the preferred method of operation the precipitataed mixture is partially calcined the main resulting compound will be magnesium carbonate, magnesium oxide, with a trace of oxides of heavy metals. In this calcining process some of the oxides of rare metals may be partially reduced to metal. This resulting mixture is separated and reduced to metal by the electrolytic process whereby this partially calcined mixture consisting of compounds of magnesium and of heavy metals entrapped with it, is suspended and partially dissolved in a molten cell bath consisting of fluorides of magnesium, sodium and barium. In such a method the globules of molten magnesium rise to the top of the bath and the reduced heavy metals sink to the bottom, magnesium is drained off, leaving an accumulating concentration of heavy metals at the bottom of the bath in the sludge as a by-product. After a long run this sludge may be removed and refined for the rare metals it contains.

This by-product process is a means of obtaining gold from the seas.

It may also be mentioned that in some cases, particularly where the final evaporation is carried out in the air, by sun and wind, the salt (sodium chloride) should be freed from a trace of alkalinity by neutralizing with a weak hydrochloric acid solution.

There are difficulties with such out-of-door methods because of the loss of valuable potassium salts. This was mentioned in my former application, Serial No. 114,476 filed September 8, 1949, and now abandoned. Due to lack of thermal control potassium salts will precipitate over a wide band. Such difficulties are avoided by using artificial evaporation in the final stages as described herein.

In brief this covers the new process. In discussing the apparatus needed, the bulk of the equipment is available from stock items; various alloy piping, valves, pumps, evaporators, centrifuges and rotary suction filters are on the market and readily available. It should be understood that boilers, necessary condensers, heat interchangers and steam piping would also be necessary. These are not shown, to reduce the schematic plan for simplicity to barest essentials.

This covers the standard equipment. There are, however, two items vital and necessary to the process which are novel. One is the evaporator-precipitator already described in my former application Ser. No. 114,476, filed September 8, 1949, and the other is the new glass, wire reinforced settling and treating tank. This is fully described in my copending application Ser. No. 527,956 filed August 12, 1955, now abandoned.

Having described the process and system, it is felt those skilled in this and the allied arts can construct such a plant and operate it in accordance with the description outlined. Obvious changes in apparatus or method steps and arrangement of parts can be made without departing from the spirit and scope of this invention as defined in the appended claims.

I claim:
1. In the art of obtaining sodium chloride from sea water, the method which comprises concentrating sea water in open ponds to the incipient saturation of the brine with magnesium salts, transferring the concentrated brine to settling tanks, treating the brine with sodium carbonate sufficient to precipitate the bulk of the magnesium as carbonate and the compounds of heavy metals formed after reacting with sodium carbonate, effecting separation by settling, removing the clear brine to a heating zone, boiling the brine to further concentrate it and separating out the bulk of the sodium chloride as the brine concentrates and continuing the evaporation of brine and separation of sodium chloride to the incipient precipitation of potassium salt, transferring hot clear brine to a zone of reduced pressure and therein cooling the brine abruptly by spraying it into said cool zone, further cooling the accumulated partially cooled brine by heat exchange and mechanically separating out of the further cooled brine, precipitated potassium salt.

2. The method of claim 1 including subjecting the brine from which the major portion of the sodium chloride and potassium salts have been removed to electrolysis under conditions suitable for the liberation of bromine and collecting the liberated bromine.

3. The continuous process of recovering successively high grade table salt and valuable by-products from sea water which has an original specific gravity of substantially 1.024 at 27° C., and has traces of rare heavy metals, comprising evaporating said brine in open shallow ponds to a specific gravity of substantially 1.185 to precipitate most of the calcium salts, adding calcium chloride to eliminate 60–90% of the remaining sulphate by the resulting precipitation of calcium sulphate, adding a trace of soda ash to eliminate calcium, transferring the brine to a basin for further evaporation and initial precipitation of sodium chloride to a specific gravity of substantially 1.25, then cycling said brine to settling tanks and treating it with sufficient soda ash to precipitate all the magnesium primarily as carbonate of magnesium using substantially 5% excess of soda ash, after said last named precipitate has settled transferring the clear treated brine to an evaporator, recovering sodium chloride by evaporation at a temperature range of 82–100° C. and by mechanical separation, bleeding off the remaining liquid concentrated with potassium salts to an evaporator-precipitator, separating out potassium salts by evaporative cooling, by-passing a part of the remaining concentrated hot solution from said evaporator-precipitator which is rich in carbonate and bromide ions, through an electrolytic cell to release the bromine, condensing and separating said bromine, passing the remaining concentrated solution of alkali from said electrolytic cell to storage tanks for use in treatment of new brines, treating said magnesium precipitate in said settling tanks with clear fresh water in the proportion of substantially 1½ parts of water to one part of the heavy brine soaked precipitate, after settling, routing the clear weakened brine back to said evaporating tank, concentrating and washing said magnesium precipitate by the continuous countercurrent decantation process and thickening it by evaporation for easy handling, and calcining said precipitate.

References Cited in the file of this patent

UNITED STATES PATENTS

| | | |
|---|---|---|
| 681,407 | Coward | Aug. 27, 1901 |
| 1,252,784 | Cox | Jan. 8, 1918 |
| 1,310,449 | Seward | July 22, 1919 |
| 1,310,450 | Seward | July 22, 1919 |
| 1,376,610 | Dow | May 3, 1921 |
| 1,435,524 | Huber | Nov. 14, 1922 |
| 1,520,920 | Yngve | Dec. 30, 1924 |
| 1,657,633 | Martin | Jan. 31, 1928 |
| 1,810,181 | MacDonald et al. | June 16, 1931 |
| 1,865,451 | Allyn | July 5, 1932 |
| 1,986,334 | Gearing et al. | Jan. 1, 1935 |
| 2,375,009 | Lepsoe et al. | May 1, 1945 |
| 2,606,839 | Evans | Aug. 12, 1952 |
| 2,752,303 | Cooper | June 26, 1956 |
| 2,793,099 | Clarke | May 21, 1957 |
| 2,825,685 | Schachter et al. | Mar. 4, 1958 |

FOREIGN PATENTS

| | | |
|---|---|---|
| 26,777 of 1898 | Great Britain | Sept. 23, 1899 |

OTHER REFERENCES

Hunter: The Electrochemistry of the Dow Magnesium Process, from "The Electrochemical Society," reprinted 86–30, pages 343–353.

Sease et al.: "A Molytical Chemistry," vol. 19, No. 3, March 1947, pages 197–200.

Hampel: "Rare Metals Handbook," Reinhold Publishing Corporation, New York, 1955, page 12.